United States Patent [19]
Lichtenberg

[11] Patent Number: 6,003,402
[45] Date of Patent: Dec. 21, 1999

[54] PREASSEMBLED THROTTLE VALVE CONTROL CABLE

[75] Inventor: Norman B. Lichtenberg, Shelby Township, Mich.

[73] Assignee: Teleflex Incorporated, Plymouth Meeting, Pa.

[21] Appl. No.: 09/241,563

[22] Filed: Feb. 1, 1999

Related U.S. Application Data

[63] Continuation of application No. 08/889,246, Jul. 8, 1997, abandoned.

[51] Int. Cl.[6] .............................. F16C 1/12; B60K 31/00; F02D 41/00
[52] U.S. Cl. .......................... 74/501.6; 180/170; 123/360
[58] Field of Search ................................. 74/501 R, 504, 74/506, 513, 517, 526, 502.2; 180/170, 178, 179; 123/360, 361, 396

[56] References Cited

U.S. PATENT DOCUMENTS

| 4,809,656 | 3/1989 | Suzuki | 180/179 X |
| 5,083,542 | 1/1992 | Kishimoto | 123/396 X |
| 5,113,822 | 5/1992 | Asayama | 123/360 |

*Primary Examiner*—Thomas R. Hannon
*Assistant Examiner*—Brandon C. Stallman
*Attorney, Agent, or Firm*—Howard & Howard

[57] ABSTRACT

A remote control assembly for rotating a throttle-valve shaft (18) rotatably mounted in a carburetor (14) including a control housing (22) having threaded fasteners for attaching the control housing (22) to a carburetor (14). A throttle conduit (28) is connected to the control housing (22) and a throttle core element (30) is movably supported in the throttle conduit (28) for movement in response to accelerator pedal inputs. A cruise control conduit (34) is connected to the control housing (22) and a cruise control core element (38) is movably supported in the cruise control conduit (34) for movement in response to cruise control inputs. A throttle pulley (40) is rotatably mounted in the control housing (22) and the throttle core element (30) is connected to the throttle pulley (40) for rotating the throttle pulley (40) in response to the movement of the throttle core element (30). A cruise control pulley (54) is pivotally mounted in the control housing (22) for limiting movement of the throttle pulley (40) and the cruise control core element (38) is connected to the cruise control pulley (54) for pivoting the cruise control pulley (54) in response to the movement of the cruise control core element (38). A drive shaft (42) is rotatably supported by the control housing (22) and coupled (64) to the throttle-valve shaft (18) for transmitting motion of the throttle pulley (40) to the throttle-valve shaft (18).

9 Claims, 2 Drawing Sheets

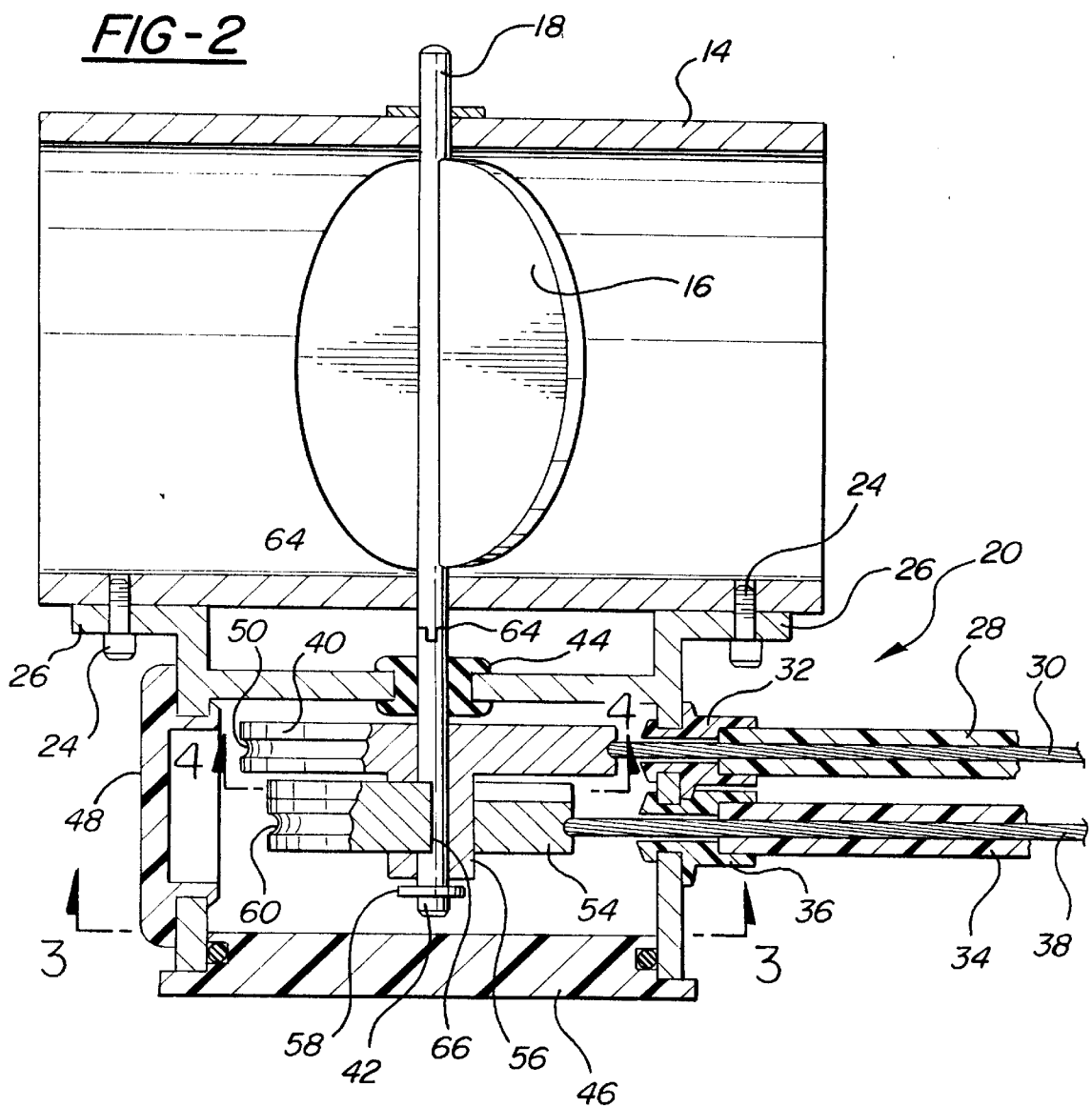
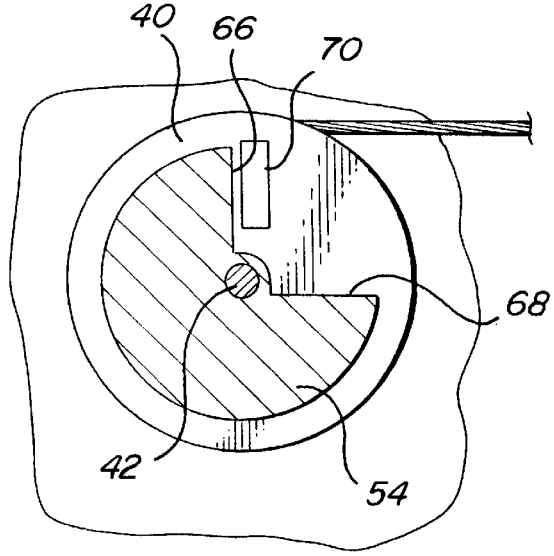

PREASSEMBLED THROTTLE VALVE CONTROL CABLE

This application is a continuation of Ser. No. 08/889,246 filed Jul. 8, 1997, now abandoned.

BACKGROUND OF THE INVENTION

1. Field of the Invention

The subject invention relates to a motion transmitting remote control assembly of the type for transmitting motion in a curved path by a flexible motion transmitting remote control assembly and, more particularly, to such a control assembly specifically dedicated to operating a throttle valve in an internal combustion engine carburetor.

2. Description of the Prior Art

The throttle valve is normally operated by various complex linkage and cable systems such as those shown in U.S. Pat. No. 4,041,797 to Mito and U.S. Pat. No. 4,838,820 to Boda et al. However, there remains a need for a system which is a subassembly which can be easily and quickly assembled with the carburetor.

SUMMARY OF THE INVENTION AND ADVANTAGES

The invention comprises a remote control assembly for rotating a throttle-valve shaft rotatably mounted in a carburetor including a control housing having attachment means for attaching the control housing to a carburetor. A throttle conduit is connected to the control housing and a throttle core element is movably supported in the throttle conduit for movement in response to accelerator pedal inputs. A throttle lever is pivotally mounted in the control housing and the throttle core element is connected to the throttle lever for pivoting the throttle lever in response to the movement of the throttle core element. A drive means is movably supported by the control housing for transmitting motion of the throttle lever to the throttle-valve shaft. A cruise control device is supported in the control housing for limiting movement of the throttle lever in response to cruise control inputs. Such an assembly is fabricated into a subassembly which can be easily and quickly assembled with the carburetor.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2 is a cross sectional view of the subject invention attached to the throttle valve of a carburetor;

FIG. 4 is a cross sectional view taken along 4—4 of FIG. 2.

DETAILED DESCRIPTION OF THE PREFERRED EMBODIMENT

Figure 1:
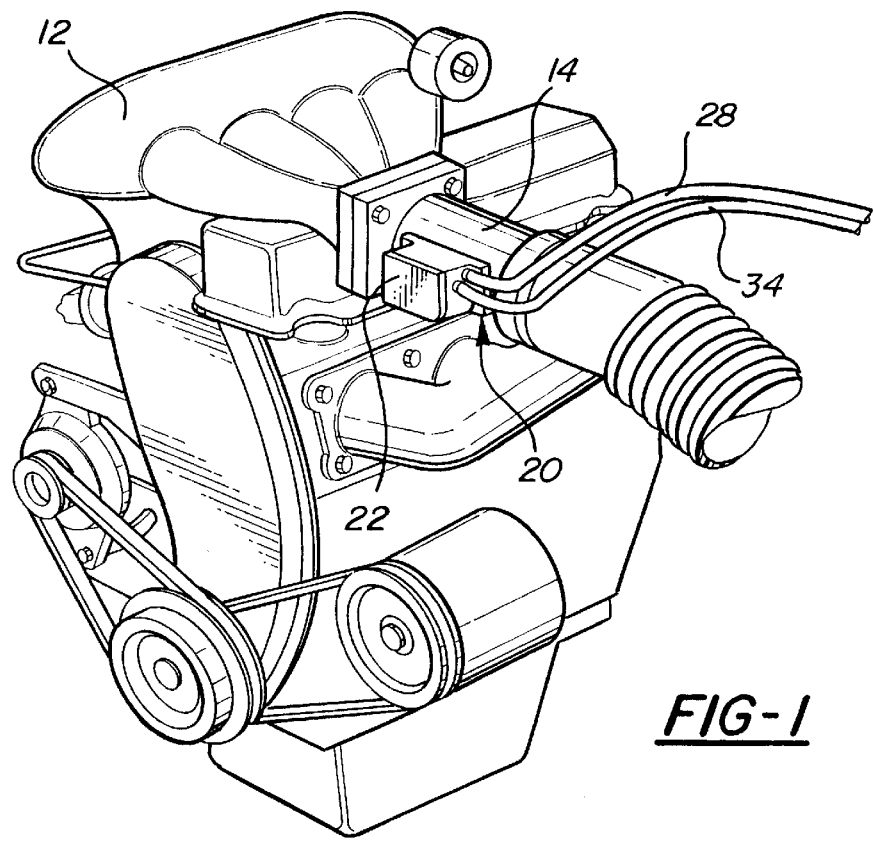
FIG. 1 is a perspective view of an engine and a carburetor with the subject remote control assembly attached.
Figure 3:
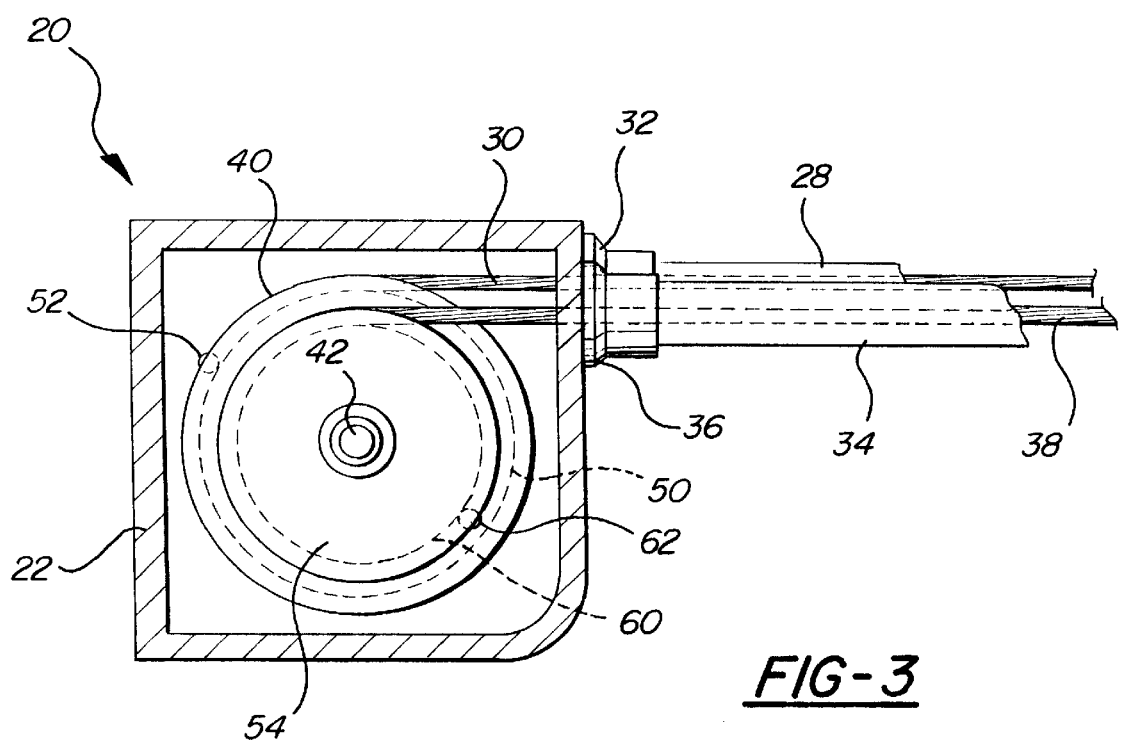
FIG. 3 is a cross sectional view taken along line 3—3 of FIG. 2.

Referring to the Figures, wherein like numerals indicate like or corresponding parts throughout the several views, an automotive engine assembly is shown in FIG. 1, including an intake manifold 12 and a carburetor 14. The carburetor 14 includes a throttle valve 16 secured to a throttle-valve shaft 18, which is, in turn, rotatably mounted in the carburetor 14. A remote control assembly for rotating the throttle-valve shaft 18 is generally shown at 20.

The remote control assembly 20 comprises a control housing 22 having attachment means for attaching the control housing 22 to the carburetor 14. The attachment means comprises threaded fasteners 24 extending through mounting flanges 26 which are integral to the housing 22.

A throttle conduit 28 is connected to the control housing 22. A throttle core element 30 is movably supported in the throttle conduit 28 for movement in response to accelerator pedal inputs. In other words, one end of the throttle core element 30 is attached to the universally used accelerator pedal on the floorboard of a vehicle. A fitting or ferrule 32 is bonded to the end of the throttle conduit 28 and is snapped into seated relationship with a hole through the side wall of the housing 22.

A cruise control conduit 34 is connected to the control housing by a fitting or ferrule 36, also bonded to the conduit 34. A cruise control core element 38 is movably supported in the cruise control conduit 34 for movement in response to cruise control inputs, i.e., a cruise control setting made by the operator of the vehicle. For example, an input may be made to an electronic selector which, in turn, sends a signal to actuate an actuator to move the cruise control core element 38 a predetermined distance.

A throttle lever in the form of a throttle pulley 40 is pivotally mounted in the control housing 22. More specifically, a drive means in the form of a drive shaft 42 is movably supported by the control housing 22 for transmitting motion of the throttle pulley 40 to the throttle-valve shaft 18, i.e., the throttle pulley 40 is splined or keyed to the drive shaft 42 for rotation therewith. A bearing or bushing 44 rotatably supports the drive shaft 42 in the wall of the housing 22. The housing 22 has a cap 46 for sealing one wall and the cap could provide a bearing support for the distal end of the drive shaft 42. In addition, an access plug 48 is in sealing engagement with a hole in the housing 22. The throttle pulley 40 has an annular groove 50 and the throttle core element 30 is entrained about the throttle pulley 40 in the groove 50. The throttle core element 30 is connected at its other end to the throttle pulley 40 by a slug 52 disposed in a slot in the throttle pulley 40 for pivoting the throttle pulley 40 in response to the movement of the throttle core element 30.

A cruise control lever, in the form of a cruise control pulley 54, is also pivotally mounted in the control housing 22 for limiting movement of the throttle pulley 40. More specifically, the throttle pulley 40 includes an extension defining a hub 56 for rotatably supporting the cruise control pulley 54. Both pulleys 40 and 54 are retained on the drive shaft 42 by a snap ring 58 and the cruise pulley 54 is rotatably supported by the drive shaft 42 through the hub 56. The cruise control pulley 54 also has an annular groove 60 and the cruise control core element 38 is connected to the cruise control pulley 54 by a slug 62 for pivoting the cruise control pulley 54 in response to the movement of the cruise control core element 38.

As alluded to above, the control housing 22 includes various seal means for sealing the control housing 22 from the environment outside the housing 22.

A coupling or mechanical joint 64 disposes the drive shaft 42 in driving engagement with the throttle-valve shaft 18.

The cruise control pulley 54 includes a stop for limiting rotation of the throttle pulley 40. More specifically, the stop of the cruise control pulley 54 comprises an opening or pie-shaped cutout extending about an annular portion of the cruise control pulley 54 between sides 66 and 68, i.e., side or stop surfaces 66 and 68. The pie-shaped cutout is in a disc forming the inside of the cruise control pulley 54. A projection 70 extends from the throttle pulley 40 and into the pie-shaped opening between the radial surfaces 66 and 68 whereby the cruise control pulley 54 may be rotated in a first, clockwise direction by the cruise control core element 38 to a cruise position for limiting rotation of the throttle pulley 40 in the opposite, counterclockwise direction while allowing rotation of the throttle pulley 40 in the first, clockwise direction from the cruise position as the projection 70 moves in the pie-shaped opening 66 to 68. The cruise control pulley 54, the projection 70 and the pie-shaped opening 66 to 68 define a cruise control device for limiting movement of the throttle lever in response to cruise control inputs.

In operation, the cruise control is set by the operator to place the cruise control core element 38 in tension to rotate the cruise control pulley 54 in the clockwise direction to a cruise position. In so rotating to the cruise position, the shoulder or side 66 of the stop or shoulder is rotated to a radial position to limit rotation of the projection 70 backward from the predetermined cruise position; yet the accelerator pedal may be depressed to place the throttle core element 30 in tension to rotate the throttle pulley 40 forwardly in the clockwise direction to move the projection 70 forwardly in the clockwise direction from the side or stop surface 66. However, when the accelerator pedal is released, a spring in the system (not shown) returns the throttle pulley 40 in the counterclockwise direction to return the projection to the position of the side or stop surface 66, i.e., the selected cruise position. When the selected cruise position is released, the cruise control pulley 54 rotates in the counterclockwise direction to allow the throttle pulley 40 to also rotate in the counterclockwise direction toward the idle position.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A remote control assembly for rotating a throttle-valve shaft (18) rotatably mounted in a carburetor (14), said assembly comprising;
   a control housing (22) having attachment means for releasably attaching said control housing (22) to a carburetor (14);
   a drive shaft (42) rotatably supported by said control housing (22);
   a releasable coupling (64) extending in the direction of said attachment means for disposing said drive shaft (42) in driving engagement with the throttle-valve shaft (18);
   a throttle conduit (28) connected to said control housing (22);
   a throttle core element (30) movably supported in said throttle conduit (28) for movement in response to accelerator pedal inputs;
   a cruise control conduit (34) connected to said control housing (22);
   a cruise control core element (38) movably supported in said cruise control conduit (34) for movement in response to cruise control inputs;
   a throttle lever (40) extending radially from said drive shaft (42) whereby said throttle lever (40) is pivotally mounted in said control housing (22);
   said throttle core element (30) connected to said throttle lever (40) for pivoting said throttle lever (40) in response to said movement of said throttle core element (30);
   a cruise control lever (54) for limiting movement of said throttle lever (40) and extending radially from said drive shaft (42) whereby said cruise control lever (54) is pivotally mounted in said control housing (22); and
   said cruise control core element (38) being connected to said cruise control lever (54) for pivoting said cruise control lever (54) in response to said movement of said cruise control core element (38).

2. An assembly as set forth in claim 1 including seal means for sealing said control housing (22) from the environment outside said housing (22).

3. An assembly as set forth in claim 1 wherein said throttle lever (40) comprises a throttle pulley non-rotatably secured to said drive shaft (42) with said throttle core element (30) entrained about said throttle pulley (40).

4. An assembly as set forth in claim 3 wherein said cruise control lever (54) comprises a cruise pulley rotatably supported by said drive shaft (42) with said cruise control core element (38) entrained about said cruise control pulley (54).

5. An assembly as set forth in claim 4 wherein said cruise control pulley (54) includes a stop for limiting rotation of said throttle pulley (40).

6. An assembly as set forth in claim 5 wherein said stop of said cruise control pulley (54) comprises an opening (66, 68) extending about an annular portion of said cruise control pulley (54), a projection (70) extending from said throttle pulley (40) and into said opening (66, 68) whereby said cruise control pulley (54) may be rotated in a first direction by said cruise control core element (38) to a cruise position for limiting rotation of said throttle pulley (40) in the opposite direction while allowing rotation of said throttle pulley (40) in the first direction from said cruise position as said projection (70) moves in said opening (66, 68).

7. A throttle assembly comprising:
   a carburetor (14) rotatably supporting a throttle-valve shaft (18);
   a control housing (22) releasably attached to said carburetor (14);
   a throttle conduit (28) connected to said control housing (22);
   a throttle core element (30) movably supported in said throttle conduit (28) for movement in response to accelerator pedal inputs;
   a cruise control conduit (34) connected to said control housing (22);
   a cruise control core element (38) movably supported in said cruise control conduit (34) for movement in response to cruise control inputs;
   a throttle lever (40) pivotally mounted in said control housing (22);
   said throttle core element (30) connected to said throttle lever (40) for pivoting said throttle lever (40) in response to said movement of said throttle core element (30);

a cruise control lever (54) pivotally mounted in said control housing (22) for limiting movement of said throttle lever (40);

said cruise control core element (38) connected to said cruise control lever (54) for pivoting said cruise control lever (54) in response to said movement of said cruise control core element (38); and drive means (42) movably supported by said control housing (22) for transmitting motion of said throttle lever (40) to said throttle-valve shaft (18) wherein said drive means (42) includes a drive shaft and a releasable coupling (64) for disposing said drive shaft in driving engagement with said throttle-valve shaft (18).

8. An assembly as set forth in claim 7 wherein said throttle lever (40) comprises a throttle pulley non-rotatably secured to said drive shaft (42) with said throttle core element (30) entrained about said throttle pulley (40) and said cruise control lever (54) comprises a cruise pulley rotatably supported by said drive shaft (42) with said cruise control core element (38) entrained about said cruise control pulley (54).

9. A throttle assembly comprising:

a carburetor (14) rotatably supporting a throttle-valve shaft (18);

a control housing (22) having attachment means for releasably attaching said control housing (22) to said carburetor (14);

a drive shaft (42) rotatably supported by said control housing (22);

a releasable coupling (64) extending in the direction of said attachment means and connecting said drive shaft (42) in driving engagement with said throttle-valve shaft (18);

a throttle conduit (28) connected to said control housing (22);

a throttle core element (30) movably supported in said throttle conduit (28) for movement in response to accelerator pedal inputs;

a cruise control conduit (34) connected to said control housing (22);

a cruise control core element (38) movably supported in said cruise control conduit (34) for movement in response to cruise control inputs;

a throttle lever (40) extending radially from said drive shaft (42) whereby said throttle lever (40) is pivotally mounted in said control housing (22);

said throttle core element (30) connected to said throttle lever (40) for pivoting said throttle lever (40) in response to said movement of said throttle core element (30);

a cruise control lever (54) for limiting movement of said throttle lever (40) and extending radially from said drive shaft (42) whereby said cruise control lever (54) is pivotally mounted in said control housing (22); and said cruise control core element (38) being connected to said cruise control lever (54) for pivoting said cruise control lever (54) in response to said movement of said cruise control core element (38).

* * * * *